No. 768,881. PATENTED AUG. 30, 1904.
J. & R. B. MORROW.
COMPLETE HARVESTER.
APPLICATION FILED APR. 30, 1902.
NO MODEL. 6 SHEETS—SHEET 1.

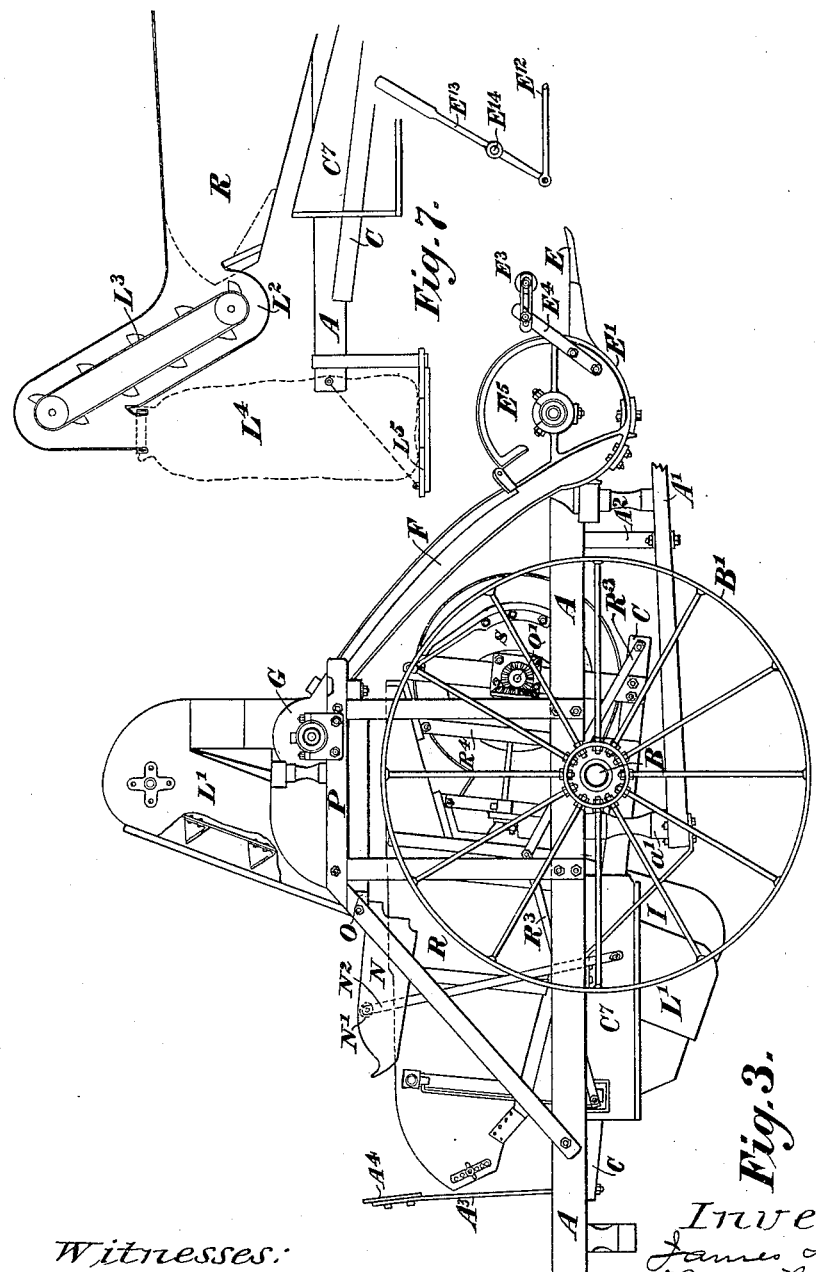

No. 768,881. PATENTED AUG. 30, 1904.
J. & R. B. MORROW.
COMPLETE HARVESTER.
APPLICATION FILED APR. 30, 1902.
NO MODEL. 6 SHEETS—SHEET 4.
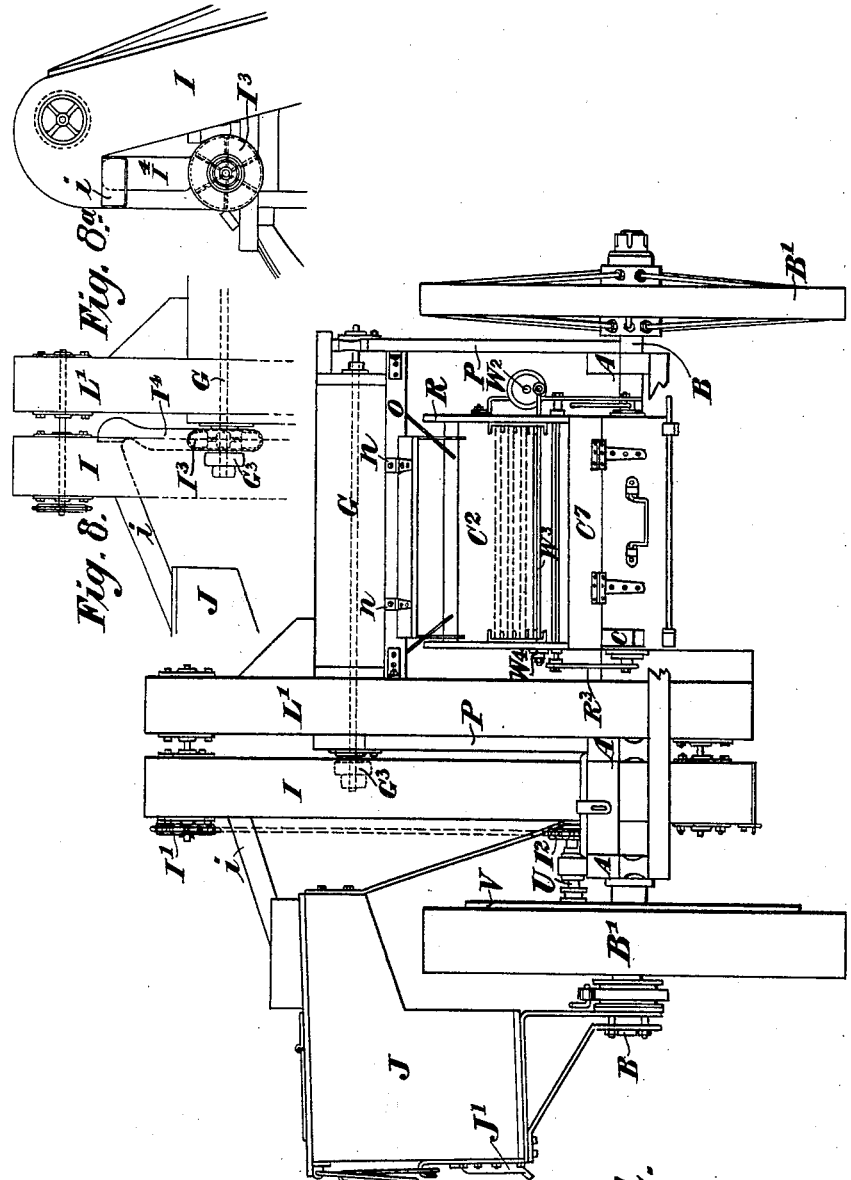

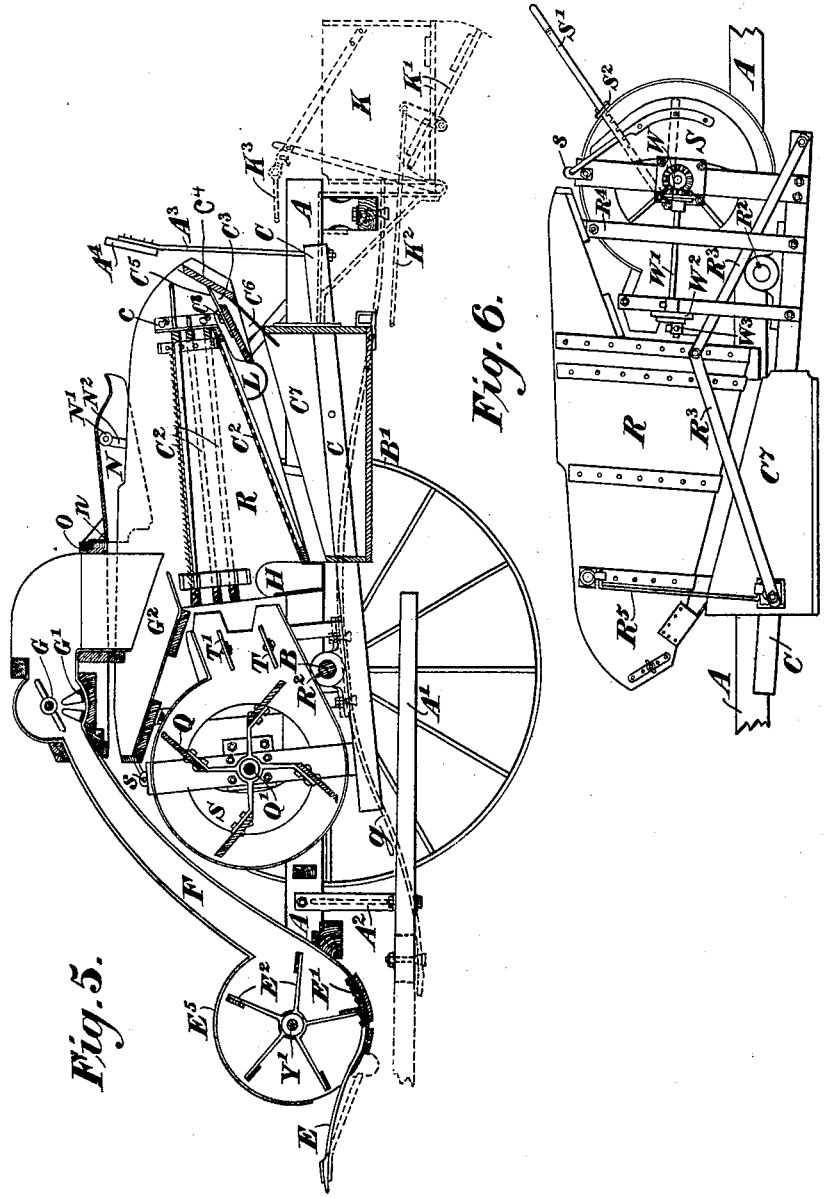

No. 768,881. PATENTED AUG. 30, 1904.
J. & R. B. MORROW.
COMPLETE HARVESTER.
APPLICATION FILED APR. 30, 1902.
NO MODEL. 6 SHEETS—SHEET 6.
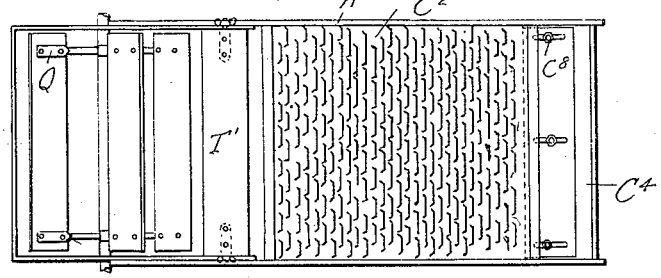
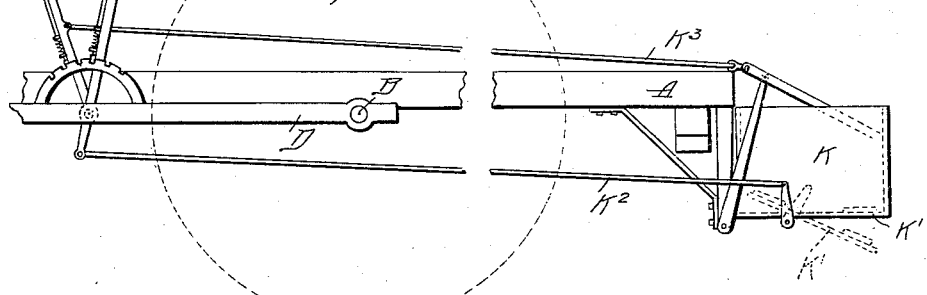
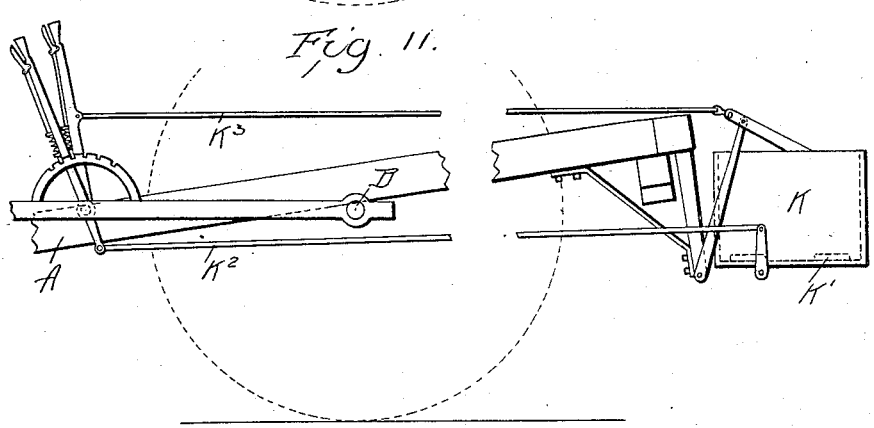
Attest:
C. S. Middleton
L. B. Middleton
Inventors
James Morrow
Robert Blake Morrow
by Richards & Co
Attys.

No. 768,881. Patented August 30, 1904.

UNITED STATES PATENT OFFICE.

JAMES MORROW AND ROBERT BLAKE MORROW, OF CARLTON, VICTORIA, AUSTRALIA.

COMPLETE HARVESTER.

SPECIFICATION forming part of Letters Patent No. 768,881, dated August 30, 1904.

Application filed April 30, 1902. Serial No. 105,367. (No model.)

*To all whom it may concern:*

Be it known that we, JAMES MORROW and ROBERT BLAKE MORROW, agricultural implement and machine manufacturers, both subjects of the King of Great Britain and Ireland, residing at Nos. 33 to 49 Bouverie street, Carlton, in the British State of Victoria, Commonwealth of Australia, have invented a certain new and useful Improvement in Complete Harvesters, of which the following is a specification.

This invention relates to harvesting-machines which strip, clean, and bag grain while at work in the field; and the improvements consist mainly of the combination and arrangement of the various parts comprised in the harvester.

The invention will now be described, aided by a reference to the attached sheets of drawings, throughout which similar letters will be used to denote corresponding parts.

Figure 1:
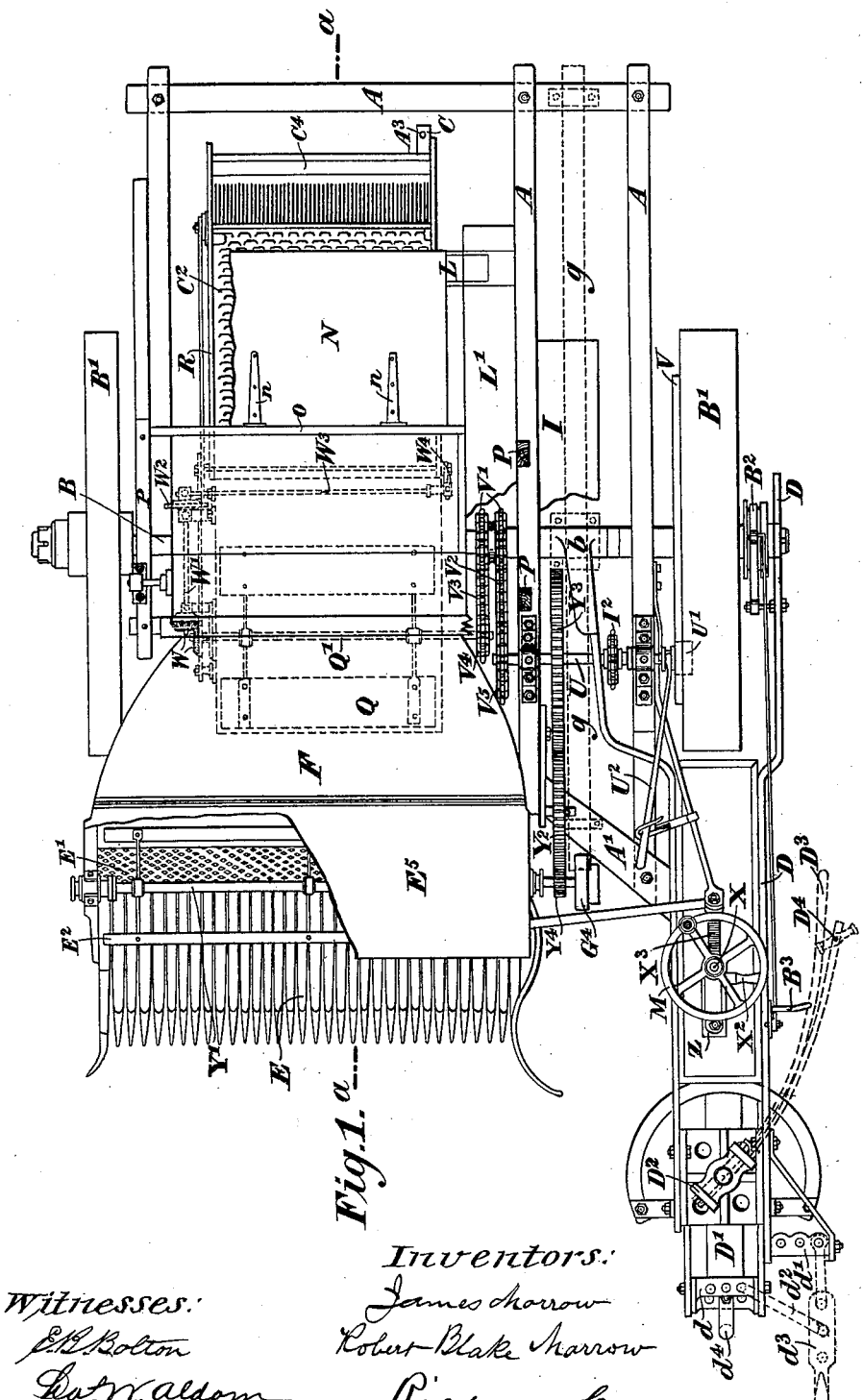
Figure 2:
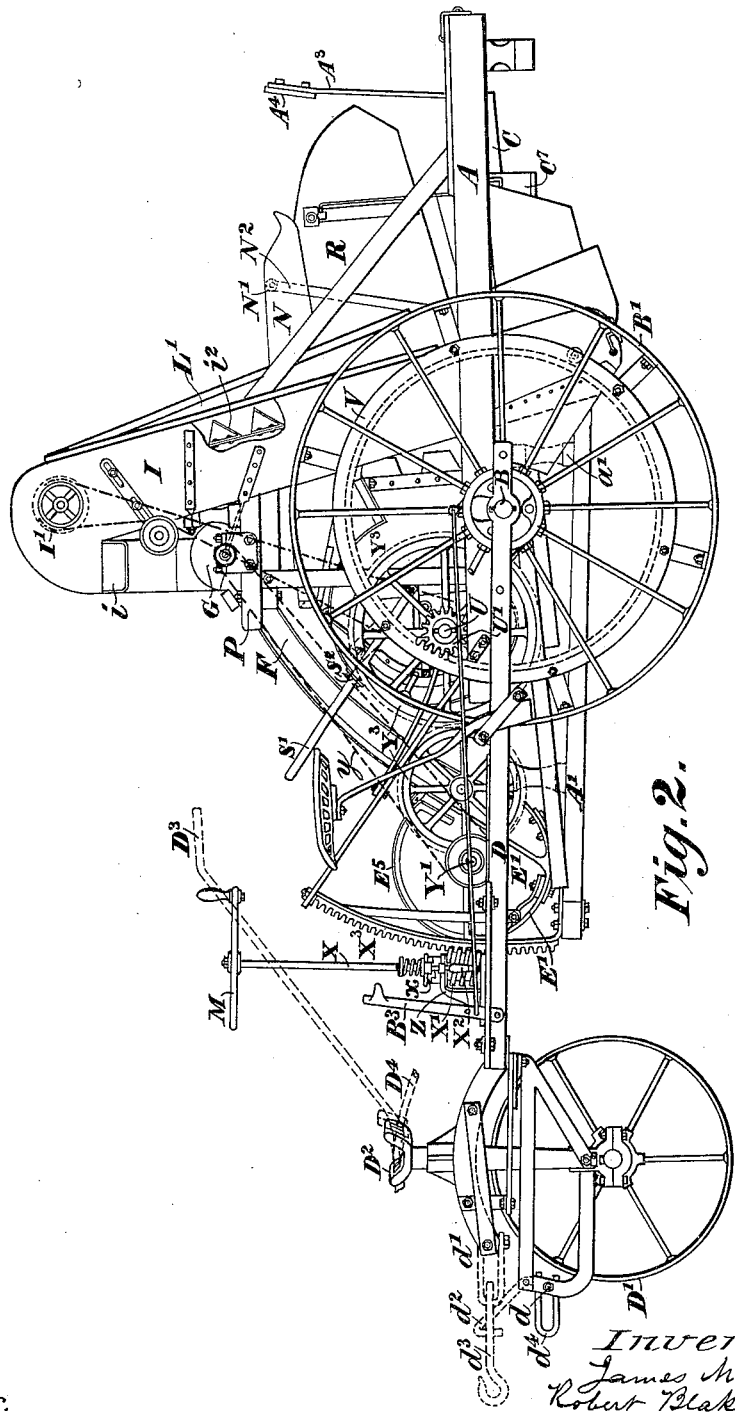

Figure 1 is a general plan of a complete harvester having our improvements embodied in it; Fig. 2, an elevation of its near side; Fig. 3, an elevation of its off side; Fig. 4, a back elevation of the machine and showing it furnished with a grain-box; Fig. 5, a vertical longitudinal section taken on line $a\,a$, Fig. 1, and showing in dotted lines a chaff-box attached to back of machine; Fig. 6, an off-side elevation of the winnower or riddle-box and fan as supported on its frame. Fig. 7 is a side view of the appliances for catching and bagging the chaff; and Figs. 8 and $8^a$ are detail back and side views, respectively, of the mechanism for finally dressing the grain prior to its reaching the grain-box. Fig. 9 is a plan view of the lipped riddle, and Figs. 10 and 11 are detail views showing the operating connections to the chaff-box K.

A is the body foundation-frame, hereinafter called the "body-frame," supported on an axle B, borne by wheels B', the near-side one of which acts as the main drive-wheel. The body-frame A may either be of wood or metal, having on its under side a transverse T or angle-iron stay $A^2$ and a post $a'$, below which is a diagonal bar A', which carries a toothed segment $X^3$.

E is the comb at front of body; E', concave, and $E^2$ the beaters; F, the throat or chute leading from beaters to a peg or damp-weather threshing-drum G and delivering thereto at a position below its center, the said peg-drum working in combination with a double-finger concave G', the threshed heads from which fall to a chute $G^2$, leading to the riddles or screens $C^2$. The clean or screened grain leaves the riddles by a grain-spout H, which leads to the well of an elevator I, which conveys by cups $i^2$ the grain to a spout $i$, delivering to a bagging-bin J, while the unthreshed heads are deposited in a headings-spout L at back of riddles and returned by an elevator L' to the peg-drum G to be rethreshed. The chaff from the riddles is blown into and retained by a chaff-bin K, which is adjustably supported at tail end of machine, and it is provided with a hinge-bottom K', which can be opened at intervals to discharge its contents by a rod $K^2$, connected with the bottom, passing to an operating-lever near the driver's seat. $K^3$ is a rod also controlled by an operating-lever and designed to adjust the horizontal position of the chaff-box.

The fan Q and riddle-box R are carried by a frame C, preferably secured on main axle B by keys $R^2$, said main axle being in turn made secure to the main bars of the fore-carriage D. The riddle-box is supported in position by angularly-arranged spring-stays $R^3$, straps $R^4$, and vertical rods $R^5$, all carried at their lower ends by frame C in such a manner as to permit the riddle-box to receive its side shake, while the fan Q has both its end openings furnished with adjustable windboards S, hinged at $s$. The position of the boards S over the openings is adjusted by a lever S', terminating near the driver's seat, said lever being held at the desired position by the notches $S^2$ in it engaging a suitable catch; also, in the fan-delivery mouth are two butterfly boards or valves T and T', which can be secured by end thumb-screws at the desired angle to adjust the direction of the blast onto the screens.

The screens or riddles $C^2$ are of punched or perforated metal, the upper ones being of the lip type, while they are held in position at their back ends by plates $c$, having diagonal slots formed in them, and which plates are secured upon the side cheeks by thumb-screws.

To enable any wild oats to be caught and be separated from the other grain at the earliest moment after once passing over end of sieves, a long narrow opening or port $C^3$ is provided at the point of junction between the sliding tail-board $C^4$ of riddles and the headings-chute L, and said port $C^3$ is furnished with a sliding or adjustable cover $C^5$, by means of which its width is regulated. The said narrow opening or port $C^3$ leads by a chute $C^6$ under the headings-chute L to a box or receptacle $C^7$, in which the wild oats are retained. Said adjustable cover $C^5$ is made of a strip of sheet metal having, say, three transverse oblong holes in it through which screws $C^8$ pass and by which it is secured at the desired position.

At the back of the peg-drum and over the riddles is a self-adjusting grain shield or arrester N, which when the machine is working in a low crop automatically comes into position and prevents the grain and heads as they are delivered to the riddles being thrown too far forward thereon, as the shield arrests the grain and causes it to fall at the desired position. It consists of a plate or shield hinged at $n$ to a cross-bar O, which is supported above the riddles by side framing P, carried on body-frame A. The free edge of the shield is backmost, while under each side of its top is a roller $N'$, supported at upper end of a bar $N^2$, the lower end of which is secured to the cheek or side of the seconds-box. Said shield is preferably made of sheet metal and of a width to suit circumstances and bent to a curved section to cast or direct the grain striking it downward upon the uppermost screen.

The gear for imparting motion to the fan Q is derived from the main spindle U, which receives its motion through pinion $U'$ from the internal spur-wheel V on the main wheel $B'$. $U^2$ is a lever for placing pinion $U'$ in or out of gear. The said main spindle U has a sprocket-wheel $V^3$ on it, which communicates motion by chain-belt $V^2$ to one of a double sprocket $V'$ running loose on axle B, the other of said double sprockets $V'$ imparting motion by belt $N^2$ to a sprocket $V^4$ on the fan-spindle $Q'$.

To impart a side shake to the riddles, the other end of the fan-spindle $Q'$ communicates motion by bevel-gear W to a shaft $W'$, upon which is an adjustable throw crank-disk $W^2$, which works a connecting-rod or pitman $W^3$, passing to a pin $W^4$ on opposite side of the riddle-box. If so desired, an adjustable throw eccentric or a ball-bearing pin, mounted on an adjusting-screw and carried either in a disk or a crank-arm, may be provided.

To enable the driver to closely watch the grain upon riddles, a mirror $A^4$ is supported on a standard $A^3$, carried on the back part of frame C, the mirror being at such a position that the riddles are reflected into it and can be seen by the driver from his seat.

The fore-carriage D is borne at its front above a steering-wheel $D'$, while its hind part is supported by the main axle B at each side of the main drive or traction wheel $B'$, the hub of which is provided with a drum to receive a brake-strap $B^2$, which is connected by a rod with a foot-lever $B^3$, arranged adjacent to the driver's seat. The said steering-wheel $D'$ has a holed draft-bar $d$ attached to its moving or swivel frame, while a holed draft-bracket $d'$ is secured to the fore-carriage, and said bars $d$ and $d'$ can be coupled together by a link $d^2$, attached to a draw-hook $d^3$, and when so coupled and drawn by the horses the wheel $D'$ immediately follows the direction of travel of the horses. A shackle $d^4$ is provided on the wheel-frame to receive the usual three-horse draft-gear. $D^2$ is a coupling-piece on head of steering-wheel post, and $D^3$ and $D^4$ are respectively hand and foot steering-levers, which are capable of being secured to said piece $D^2$.

To raise and lower the body, a worm $x'$ on vertical spindle X is geared with the segment $X^3$, said spindle being rotated by the hand-wheel M and having combined with it a bevel-clutch $x$, which allows the worm to be rotated to lift the comb without the driver having to press his foot on the releasing-lever $X^2$; but said clutch has to be lifted to allow the worm-gear to rotate to lower the comb. Said clutch is fitted on a square part of the spindle X, and its jaws engage jaws formed at top of the worm-bracket Z.

To obtain a more equable strain upon the raising and lowering gear, a longitudinal flat spring $g$ (shown by dotted lines, Figs. 1 and 5) is secured at about its center to the stationary sleeve $b$ on the main axle B or to any stationary part on the fore-carriage, the one end of said spring extending to near the back of machine and bearing tightly upon under side of back part of body-frame, while the other end of the spring $g$ bears in a similar manner upon under side of the front part of the body-frame or under the diagonal bar $A'$, or the ends of the springs may bear upon any bar projecting from the body. The said spring thus also serves as a balance, tending to bring the machine to its normal horizontal position. A spiral or coiled spring may be arranged between the fixed and movable parts of machine to effect the same purpose as spring $g$.

The comb E has a transverse roller $E^3$ arranged above it, supported by bearings in adjustable slotted links carried by arms $E^4$, the roller being aranged above the comb to regulate the feed in high crops and to avoid its taking in too much straw, and so losing grain by the heads beating against the drum-casing $E^5$.

The elevators are driven by chain-belt leading from sprocket $I^2$ on main drive-spindle U to a sprocket I' on upper spindle of elevators and which spindle imparts motion to both elevators, while the peg-drum G is driven by a belt $y$, which derives motion from a pulley on the beater-spindle Y', the latter having a pinion $Y^4$ on it to which motion is imparted by spur-gear $Y^2$ and $Y^3$ from the main drive-spindle U.

Under the clean-grain bin J a bagging-platform is sometimes arranged to support the bags while filling, the grain passing to the bags through suitable cut-off spouts J' and the platform being so suspended that a jerking motion can be imparted to it by working a hand-lever.

The chaff blown over the rear end of the riddles R is, as shown in Fig. 7, led by an apron provided to the well $L^2$ of an elevator $L^3$, assembled at back of machine, and said elevator delivers the chaff to a bag $L^4$, arranged under its mouth, a small bag-platform $L^5$ being provided between the body-frame bars A at back of machine to seat the bag upon. The elevator may be driven by a belt from a pulley on any convenient spindle of the machine.

To effect a second or final dressing of the grain, we arrange, as shown in Figs. 8 and 8ª, a small fan $I^3$ on the machine—say on the near end of the damp-weather spindle G—and convey the air-current through a branch pipe $I^4$ to the chute $i$ leading to the grain-bin J, so that as the grain is passing therethrough it will be acted on by air-current, or, if preferred, the grain may pass over a sieve-bottom formed in said chute $i$ and the air-current pass upward through it in order to carry off any light stuff.

In many machines no provision is made for readily altering the speed of the damp-weather beater to suit the varying weather in which the machine has to work without having to unship a pulley or sheave and alter the driving-belt. We have overcome the difficulty by combining with and arranging on the end part of both the main-beater-drum spindle Y' and the damp-weather-drum spindle G a stepped or cone pulley $G^3$, arranged reversewise on said spindle in order that the speed may be altered by simply placing the belt which communicates motion between them on the requisite steps of the pulleys.

Having now described our invention, what we claim as new, and desire to secure by Letters Patent, is—

1. In a combined harvester and thresher, a supporting-axle, a main frame movably supported thereby, harvesting and threshing devices carried by said main frame, a second frame rigidly supported by said axle, a fan and riddle-box carried by said rigid frame, and an adjustable discharge-port $C^3$ in said riddle-box, substantially as described.

2. In a device of the class described, a supporting-axle, a movable frame secured thereto, harvesting and threshing devices carried thereby, a stationary frame, a riddle-box rigidly secured to the supporting-axle, a shield hinged to the stationary frame, and supports for said shield secured to the movable frame, whereby when the frame is moved the supports will be moved also to raise or lower the shield.

3. In harvesting-machines, an adjustable chaff-box as K arranged at tail of machine provided with a pivoted bottom as K' which is capable of being operated by a lever arranged near driver's seat substantially as described and shown.

4. In harvesting-machines a riddle-box as R supported above frame C by diagonal spring-stays $R^3$, vertical spring-straps $R^4$ and pivoted rods $R^5$ substantially as described and shown.

5. In combination in a threshing-machine, a supporting-axle, a movable frame secured thereto, threshing means secured to said frame, a fan and riddle-box rigidly secured to said axle, a chute leading from the threshing means to the riddle-box, an automatically-adjustable grain-shield over said riddle-box, and means for returning the unthreshed heads back to the threshing means.

6. In a machine of the class described, a threshing-cylinder adapted to preliminarily act upon the grain-heads, a passage leading upwardly and rearwardly from said cylinder, a supplemental threshing-cylinder into which said passage delivers, a delivery-passage from the rear side of said supplemental threshing-machine an inclined chute, a deflector beneath said delivery-opening, a plurality of reciprocating screens or riddles receiving the threshed grain from said deflector, and a fan located in the space beneath said supplemental cylinder and deflector and delivering a blast of air to the riddles, substantially as described.

7. In a machine of the class described, in combination with a threshing-cylinder, a plurality of reciprocating screens or riddles, a fan beneath the cylinder delivering a blast of air thereto, a grain-chute at one side of the riddles, a chute for receiving unthreshed heads at the other side, a passage for wild oats at one side of said riddles, and a receptacle beneath the riddles into which said passage delivers, substantially as described.

In witness whereof we have hereunto set our hands in presence of two witnesses.

JAMES MORROW.
ROBERT BLAKE MORROW.

Witnesses:
BEDLINGTON BODYCOMB,
W. J. S. THOMPSON.